Sept. 12, 1961  R. E. SHIPLEY  2,999,495
SPIROMETER RECORDING DEVICE
Filed Feb. 25, 1958  2 Sheets-Sheet 2
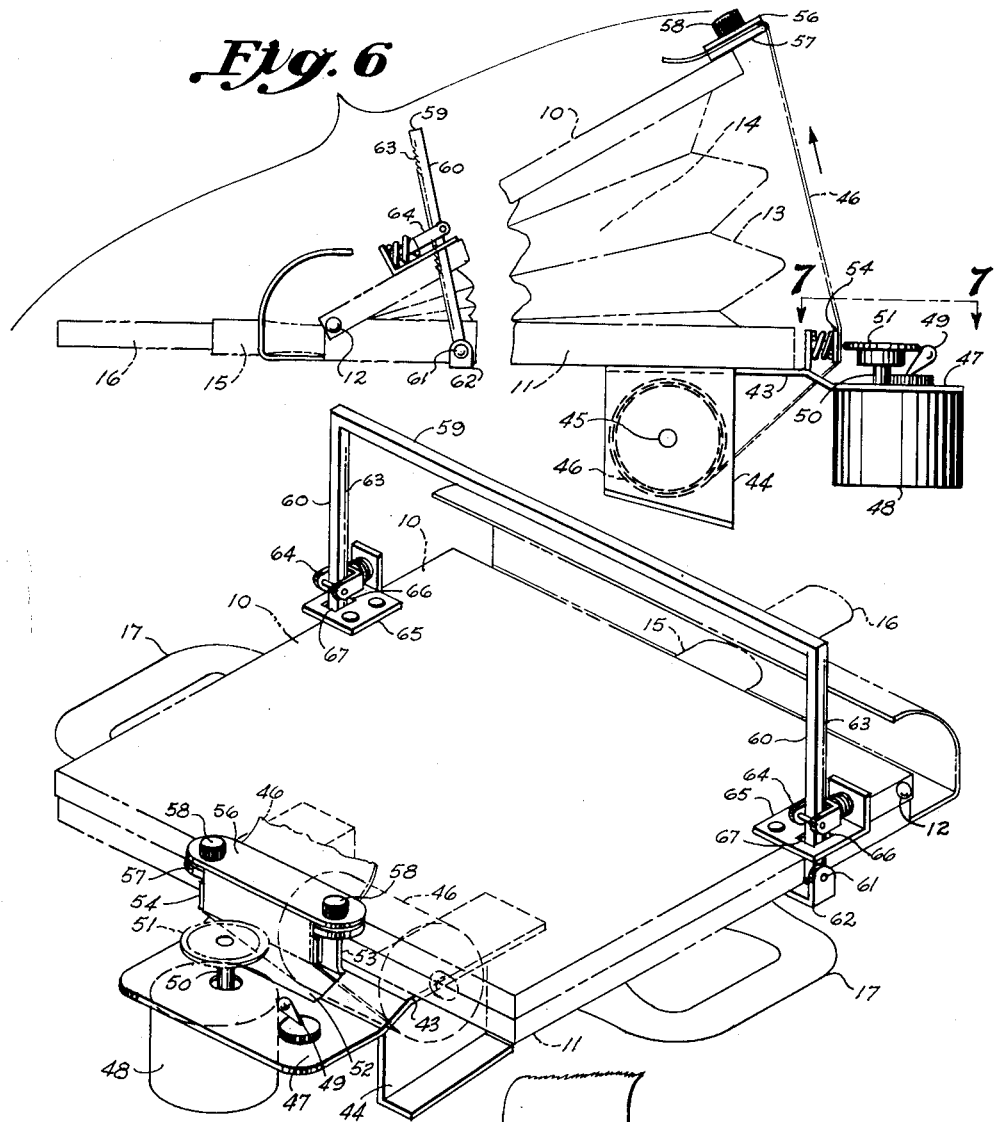
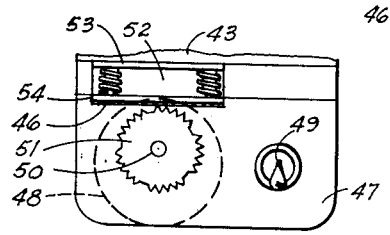
INVENTOR.
ROBERT E. SHIPLEY
BY George A. Ordway
A. M. Van Arendonk
ATTORNEYS

United States Patent Office 2,999,495
Patented Sept. 12, 1961

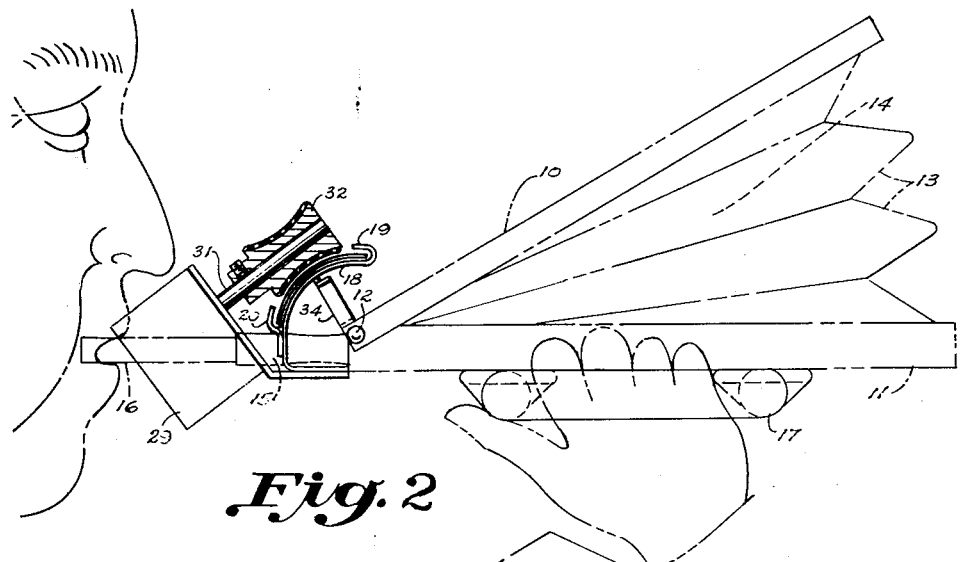
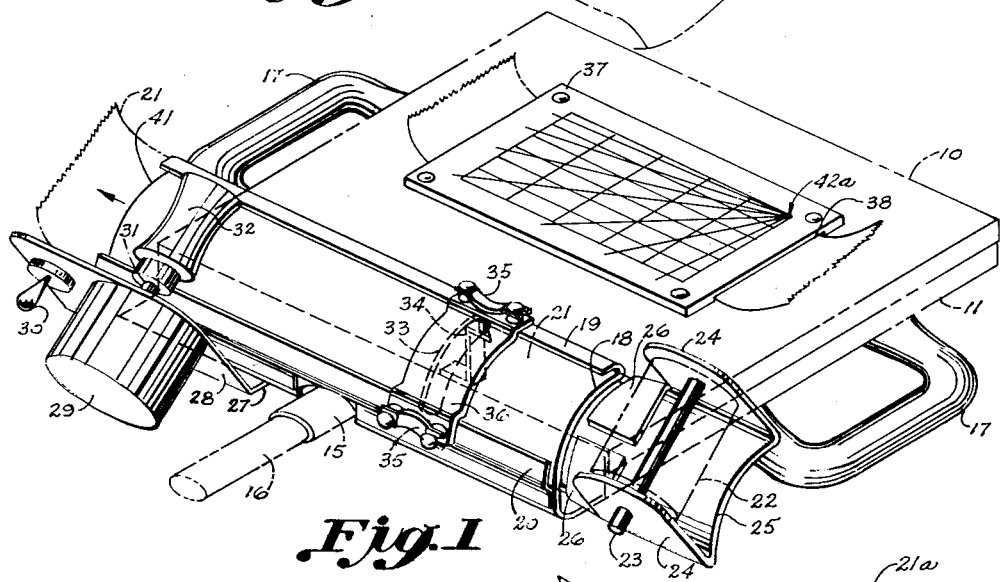
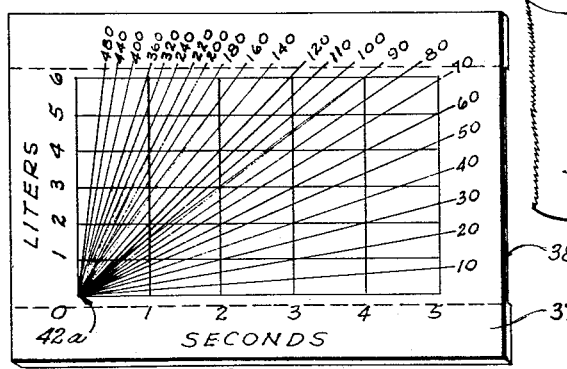

2,999,495
SPIROMETER RECORDING DEVICE
Robert E. Shipley, Indianapolis, Ind., assignor to Eli Lilly and Company, Indianapolis, Ind., a corporation of Indiana
Filed Feb. 25, 1958, Ser. No. 717,471
3 Claims. (Cl. 128—2.08)

This invention relates to spirometers of the bellows type and more particularly to a recording device therefor.

The relatively inexpensive, bellows type of spirometer has been in use for some time. One commercially available spirometer of this character is a vital capacity machine known as the "McKesson-Scott spirometer." Such apparatus comprises a bellows including a pair of walls, one upper and one lower, hinged together along their forward edges and surroundingly interconnected along their side and rear edges by flexible material to form an enclosed air-receiving chamber. Centrally of the hinged-together edges there is provided a mouthpiece intercommunicating with the air chamber. An arm affixed to the upper wall bears against and actuates a frictionally and pivotally mounted indicator projecting through a slot in a curved plate which extends upwardly from and is affixed adjacent the hinged edges to the lower wall.

Upon exhaling through the mouthpiece into the air chamber, the upper wall is displaced arcuately and upwardly an extent commensurate with the volume of air exhaled into the chamber. During the displacement movement, the actuating arm moves the indicator from a zero position along an index scale provided on one side of the slot in the curved plate so that a volumetric indication of the vital capacity may be read from such scale. A limitation of such devices as just described is that they provide means for measuring only the total quantity of air which can be exhaled (i.e., vital capacity) after a maximum inspiration or inhalation and give no measurement of the time factor involved nor indications of variation in the volume of air discharged with respect to time during the act of exhalation.

A device of this character, however, could more advantageously be used in appraising pulmonary dysfunction such as asthma and the like and in the clinical testing of the therapeutic effectiveness of bronchodilators providing that a continuous, progressive and complete graphic record of a patient's exhalation on a time-volume basis is made. With the simple indexing indicator above described, however, no means is provided for recording the volume output of an exhalation nor for registering and recording the time factor involved.

It is an object of the present invention, therefore, to provide a recording device for a spirometer of the bellows type which is effective to produce concurrently and progressively incident to a single act of exhalation thereinto from the commencement thereof to its completion a permanent, graphic record of such expiration or exhalation in terms of both volume of air exhaled and the time factor involved and thus make available to the doctor or other person carrying on a test a direct, progressive delineation of the time-volume relationship of the expired air as well as the vital capacity of the particular patient.

A further object is to provide a recording device of the character above set forth which is comprised of few parts, arranged to be easily assembled upon an existing bellows type spirometer, and which is reliably operative and inexpensive to manufacture and assemble.

A further object of the invention is to provide a graphic record of the character described which is in strip form, and which may be readily and permanently incorporated directly into a patient's medical record.

Other objects and advantages of the invention will be apparent as the description proceeds in conjunction with the accompanying drawings, and will be more particularly pointed out in the claims which follow.

In the drawings:

FIG. 1 is a perspective view of a bellows type spirometer shown in phantom and with the recording device shown in full lines as mounted thereon, the perspective being taken from the front of the device, FIG. 2 is a side elevation illustrating the device in operation but with certain of the parts being omitted and other parts being shown in section for the purpose of clarification, FIG. 3 is a top plan view of a transparent overlay calibrated with time-volume indicia useful in obtaining the desired information from the record strips, FIG. 4 shows a portion of a record strip illustrating a time-volume line typical of that which may be inscribed thereon, FIG. 5 is a perspective view similar to FIG. 1 but taken from the rear and showing a modified form of the recording device, FIG. 6 is a side elevation thereof with the bellows shown in a semi-expanded position, FIG. 7 is a fragmentary top plan view taken along the line 7—7 of FIG. 6, and FIG. 8 is a showing of a sample record strip obtainable with the modified form of device shown in FIGS. 6 through 7.

A preferred form of my invention is disclosed in FIGS. 1 through 4, inclusive. Referring to FIG. 1, therein is shown a bellows type spirometer in phantom. This apparatus includes an upper wall 10 and a lower wall 11 hinged together at their forward edges by a longitudinally extending pintle 12 (FIG. 2). The side and rear edges of walls 10 and 11 are surroundingly interconnected by accordion pleated, flexible material 13 to form an air-receiving chamber 14 interiorly thereof. Centrally of the forward edges there is provided an outwardly projecting mouthpiece 15 (FIG. 1) intercommunicating with air chamber 14. Desirably, disposable mouthpiece inserts 16 are adapted to be fitted in or over mouthpiece 15 for obvious sanitary reasons.

Upon exhaling through the mouthpiece 16 into air chamber 14, upper wall 10 is displaced arcuately and upwardly from the position shown in FIG. 1 to an extent commensurate with the volume of air exhaled into the air chamber as, for example, to a position such as illustrated in FIG. 2. If desired, handle 17 may be affixed to the underside of lower wall 11 in oppositely disposed relation to facilitate grasping the device as illustrated in FIG. 2.

The recording device comprises an upwardly projecting curved member or plate 18 extending longitudinally across the forward edges of walls 10 and 11 in slightly forward spaced relation therefrom and affixed to wall 11. An inwardly turned lip 19 formed along the upper edge of plate 18 in spaced relation therefrom and a similar spaced lip 20 suitably secured adjacent the lower end of said plate provide edge guides adapted to slidably receive a strip 21 of paper. Strip 21 may be supplied from a supply roll 22 (FIG. 1) mounted upon a spindle 23 fixed between spaced projecting ears 24 of a bracket 25 suitably secured to plate 18 or, if desired, may constitute simply an elongate single strip of paper. Adjacent the left end of bracket 25 (FIG. 1) and intermediate the right end of plate 18 are provided a pair of inturned paper guide lugs 26. Lugs 26 are formed at such an angle with respect to the flat of the paper strip being withdrawn from supply roll 22 as to flex the outer edges downwardly slightly so as to curve the paper withdrawn from roll 22 into an arcuate form preparatory to its being introduced over plate 18 and within the confines of lips 19 and 20.

A bracket 27 is affixed to the underside of wall 11 and has an upstanding flange 28 projecting angularly and upwardly therefrom. An electric synchronous motor 29, preferably of the 60 cycle A.C. type, is mounted upon said flange and a switch 30 is also mounted upon said flange to the left of said motor as viewed in FIG. 1. A shaft 31 of said motor carries at its upper end a rubber-coated roller 32. Roller 32 is arranged to frictionally engage the upper surface of paper strip 21 to advance the same. Motor 29 and switch 30 are connected through a conventional series electrical circuit (not shown) in the usual manner, preferably to a source of 60 cycle A.C. current, the circuitry being such that upon switch 30 being thrown to closed position motor 29 drives in rotation roller 32 to advance the paper strip 21 at a constant rate from supply roll 22, through guide lugs 26 and lips 19 and 20 laterally along plate 18 to the left as viewed in FIG. 1.

At a point intermediate mouthpiece 15 and the right edge of plate 18, as viewed in FIG. 1, said plate is provided with an elongate, vertically disposed slot 33 through which projects a mark-imparting point, or stylus 34 affixed to upper wall 10 of the bellows. Superposed over slot 33 and maintained in pressure contact with the upper surface of paper strip 21 by means of leaf springs 35 is a pressure pad 36 which maintains the undersurface of strip 21 in contact with the mark-imparting means or stylus 34. Paper strip 21 preferably is of a pressure sensitive type so that the stylus may be dry but it will be understood that stylus 31 may be of a type capable of imparting indicia upon the strip.

Mounted upon the upper side of wall 10 as shown in FIG. 1 is a transparent overlay 37 calibrated for example as shown in FIG. 3, the calibration values in the horizontal axis being appropriately placed to indicate properly the time factor in seconds and in the vertical axis to indicate volume in liters. Intermediate the fore and aft edges of overlay 37 it is recessed slightly as at 38 to facilitate sliding a strip such as 21a (FIG. 4) which is removed in a manner to be described later.

*Operation*

The patient is instructed to inhale to the maximum extent to which he is capable, then to insert mouthpiece 16 between his lips, and with the nose occluded and after switch 30 has been moved to "on" position and thus energizing motor 29, forcibly and with utmost vigor, exhale to the limit of his ability into chamber 14. As roller 32 is driven in rotation, strip 21 is moved leftwardly as viewed in FIG. 1 and at a constant rate of travel. As upper wall 10 rises due to the influx of air into chamber 14, mark-imparting point or stylus 34 moves downwardly from the position shown in FIG. 1, i.e., from its zero position indicated at 40 in FIG. 4 and continuously traces a time-volume line such as is exemplified at 39 upon strip 21, such line being indicative of the volume of air introduced into chamber 14 and reflecting variations in such volume with respect to time. Following the completion of the exhalation, the strip is pulled leftwardly a distance sufficient to bring the traced line 39 completely beyond the left edge 41 of plate 18 and strip 21a such as illustrated in FIG. 4 is torn therefrom. To facilitate such tearing, it will be understood that edge 41 may be serrated. Next, the torn strip 21a is slid into recess 38 under transparent overlay 37 to a position where its zero point with respect to both volume and onset of exhalation indicated at 42 coincides with the zero point 42a of the calibrations of overlay 37, following which, the expiratory flow rate data and maximal expiratory volume pertinent to the particular patient can readily, accurately and precisely be determined and the strip then removed and affixed into the patient's medical record.

Referring now to FIGS. 6 through 8, the modified form of the invention will now be described. The spirometer including the bellows, walls, mouthpiece, disposable mouthpiece insert and grasping handles is identical to the bellows structure just described in connection with the preferred form of the invention and the corresponding parts are, therefore, accordingly identified by identical reference characters.

The recording device on this modified form of the invention includes a bracket 43 secured to the underside of the rear end of wall 11. Spaced, depending flanges such as 44 formed on bracket 43 are adapted to support a horizontally disposed spindle 45 upon which is mounted a paper supply roll 46. A rearward projection 47 of bracket 43 supports a motor 48, similar to the motor 29 and also carries a switch 49. Motor 48 and switch 49 are connected through a conventional series electrical circuit (not shown) in the usual manner, preferably to a source of 60 cycle A.C., the circuitry being such that upon switch 49 being thrown to closed position motor 48 is driven in rotation. The upper end of a shaft 50 of motor 48 has secured thereto a toothed gear 51 which serves as a marking device or rotating stylus, the teeth of the gear acting as peripherally projecting point markers. Certain teeth may be eliminated from gear 51 at regularly spaced intervals for a purpose hereinafter to be described.

The leading end of the paper strip from supply roll 46 passes upwardly through a guiding aperture 52 provided in rearward projection 47 by striking a tongue 53 upwardly therefrom. Tongue 53 projects in a vertical plane and carries at its rear face a spring-pressed pressure pad 54 which yieldingly presses the paper strip 46 into marking contact with the teeth of gear 51. The leading end of the paper strip 46 is secured between upper and lower plates 56 and 57, respectively, releasably held together in clamping relation by thumb screws 58 or the like, lower plate 57 being suitably secured to the upper surface of wall 10, adjacent the rear edge thereof by any suitable fastening means.

A ratchet device is provided on this modified form of the invention which is effective to releasably lock upper wall 10 of the bellows in substantially its maximum raised position incident to a single exhalationn into the bellows. This ratchet device comprises a bail 59 having vertical legs 60 which are pivoted at their lower ends as at 61 to outwardly projecting brackets such as 62 secured to the underside of wall 11. The forward edges of legs 60 are each provided with a series of ratchet teeth 63 (see FIG. 6). Spring-urged yokes 64 are secured to brackets 65 which, in turn, are affixed to the upper surface of wall 10. Yokes 64 urge bail 59 forwardly about pivots 61 so that teeth 63 are maintained in spring-urged engagement with edges 66 provided on the forward ends of slots 67 formed in brackets 65. In this manner, as upper wall 10 is displaced from lower wall 11 during exhalation into mouthpiece 16, the edges 66 ratchet over teeth 63 and when wall 10 reaches its uppermost position commensurate with the volume of air exhaled into air chamber 14, wall 10 is releasably locked in such raised position to prevent inadvertent defacement of the record just made by descent of wall 10. Wall 10 may be readily restored to its zero position by simply pushing bail 59 rearwardly to disengage teeth 63 from edges 66 whereupon, by gravity, wall 10 descends.

Paper strip 46 is preferably of pressure-sensitive character, however, it will be understood that the teeth of gear 51 could be inked in any suitable manner as by an inking pad.

*Operation*

The operation of the form of the invention as just described is similar to that of the preferred form. The patient is instructed to take as deep a breath as possible, insert mouthpiece 16 between his lips, and then after switch 49 is moved to closed position energizing motor 48 to immediately commence forcible exhalation. As gear 51 rotates, strip 46 simultaneously moves upwardly between pressure plate 54 and gear 51 as wall 10 rises under the force of the air exhaled into chamber 14. Since motor 48 drives gear 51 at a constant rate of rotation, a series of spaced multiple marks 68 (see FIG. 8) will be made upon strip 46. The spaces between the groups of marks result from the omission of teeth at predetermined spaced intervals as hereinbefore described. These spaces separate a predetermined number of teeth into groups and the record made by the teeth reflects this grouping and thus facilitates accurate counting of the marks in calculating the total and intermediate time lapses occurring during the exhalation of any given volume of air.

Following the completed exhalation and after the motor has been turned off and bail 59 released, wall 10 descends back to the zero position shown in FIG. 5. Next, thumb screws 58 are released, the strip drawn between plates 56 and 57 a distance sufficient to place the last group of markings 68 beyond the confines of plates 56 and 57 and the leading end 46a of the strip is then torn off. By inserting the removed paper strip 46a (FIG. 8) in reading association with a suitable transparent overlay of comparable character but of different calibration to that shown in FIG. 3 the desired expiratory flow rate data pertinent to the particular patient can readily, accurately and precisely be determined and the strip then be affixed permanently into the patient's medical record.

I claim:

1. A spirometer of the portable type adapted to be held by a patient and comprising: a bellows having a pair of hinged-together end plates, an inlet duct connected to said bellows adjacent said hinge, a frame connected to one of said plates, means for mounting a sheet of paper on said frame on an arcuate surface having its center coaxial with the axis of said hinge and adapted to guide said paper parallel to the axis of said hinge, a marking means rigidly attached to said other plate and movable thereby in a direction transverse to the direction of movement of said paper for marking a line on said paper, and means for moving said paper at a uniform rate as said bellows is inflated to thereby produce a graph for determining the expiratory flow rate and vital capacity of a patient while producing a single exhalation through said duct into said bellows.

2. A spirometer as set forth in claim 1 wherein the means for moving said paper includes an electric motor.

3. A spirometer as set forth in claim 2 wherein there is provided on said frame switch means operable by the patient for controlling the starting and stopping of said electric motor.

References Cited in the file of this patent

UNITED STATES PATENTS

| | | |
|---|---|---|
| 1,781,735 | Scott | Nov. 18, 1930 |
| 2,228,983 | Bloomheart | Jan. 14, 1941 |
| 2,235,894 | Lee | Mar. 25, 1941 |
| 2,569,849 | Emerson | Oct. 2, 1951 |

FOREIGN PATENTS

| | | |
|---|---|---|
| 890,125 | France | Oct. 25, 1943 |
| 121,334 | Austria | Feb. 10, 1941 |
| 457,575 | Italy | May 23, 1950 |
| 413,628 | Italy | May 21, 1946 |